United States Patent
Farnsworth

(10) Patent No.: US 9,971,676 B2
(45) Date of Patent: May 15, 2018

(54) SYSTEMS AND METHODS FOR STATE BASED TEST CASE GENERATION FOR SOFTWARE VALIDATION

(75) Inventor: Jared Michael Farnsworth, Roseville, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 564 days.

(21) Appl. No.: 13/599,351

(22) Filed: Aug. 30, 2012

(65) Prior Publication Data
US 2014/0068339 A1   Mar. 6, 2014

(51) Int. Cl.
*G06F 11/36* (2006.01)

(52) U.S. Cl.
CPC .................... *G06F 11/3684* (2013.01)

(58) Field of Classification Search
CPC .................. G06F 11/3668; G06F 11/3684
USPC ........................................... 714/38.1
See application file for complete search history.

(56) References Cited

U.S. PATENT DOCUMENTS

| | | | |
|---|---|---|---|
| 6,934,934 B1 | 8/2005 | Osborne, II et al. | |
| 7,065,722 B2 | 6/2006 | Jain | |
| 7,197,382 B2 | 3/2007 | Prema et al. | |
| 8,090,565 B2 | 1/2012 | Gaudette | |
| 2003/0233600 A1* | 12/2003 | Hartman et al. | 714/32 |
| 2004/0015739 A1 | 1/2004 | Heinkel et al. | |
| 2005/0160321 A1 | 7/2005 | Cleaveland et al. | |
| 2005/0188271 A1 | 8/2005 | West et al. | |
| 2006/0101397 A1* | 5/2006 | Mercer et al. | 717/120 |
| 2006/0212540 A1 | 9/2006 | Chon et al. | |
| 2007/0028219 A1 | 2/2007 | Miller et al. | |
| 2007/0162894 A1* | 7/2007 | Noller et al. | 717/124 |
| 2007/0282556 A1* | 12/2007 | Achkar et al. | 702/108 |
| 2009/0006897 A1* | 1/2009 | Sarsfield | 714/38 |
| 2009/0210858 A1 | 8/2009 | Son et al. | |

(Continued)

FOREIGN PATENT DOCUMENTS

CN    101689111    3/2010

OTHER PUBLICATIONS

Notification of Transmittal of the International Search Report and the Written Opinion of the International Searching Authority, or the Declaration, Int'l Appl No. PCT/US2013/040757, 66 pages, dated Dec. 3, 2013.

(Continued)

*Primary Examiner* — Chae M Ko
(74) *Attorney, Agent, or Firm* — Dinsmore & Shohl LLP

(57) ABSTRACT

Systems and methods for state based test case generation for software validation are disclosed. One embodiment includes determining a first input and a first input type for a program block of vehicle software for creating a test case, wherein the first input type includes a state based input, determining permutations of values for the first input, based on the first input type, and running the test case with the state based input, wherein running the test case comprises applying the permutations of values for the first input to the program block. Some embodiments include determining, by a test computing device, whether the test case meets a predetermined level of modified condition/decision coverage (MC/DC) and providing an indication of whether the test case meets the predetermined level of MC/DC.

20 Claims, 6 Drawing Sheets

(56) References Cited

U.S. PATENT DOCUMENTS

| | | |
|---|---|---|
| 2010/0175052 A1 | 7/2010 | Prasad et al. |
| 2011/0004868 A1* | 1/2011 | Bharadwaj .................... 717/135 |
| 2011/0083121 A1* | 4/2011 | Dixit et al. ................... 717/124 |
| 2012/0071224 A1* | 3/2012 | Mankad ......................... 463/20 |

OTHER PUBLICATIONS

Staats et al. "On the danger of coverage directed test case generation." In: Fundamental Approaches to Software Engineer. Apr. 1, 2012 (Apr. 1, 2012). (Retrieved on Nov. 16, 2013]. Retrieved from the Internet: <URL: http://www.greggay.com/pdf/12danger.pdf>, entire document.

Lima et al. "A permutation technique for test case prioritization in a black-box environment." 13 1-20 Oct. 2008 (Oct. 13, 2008). In 2nd Brazilian Workshop on Systematic and Automated Software Testing. [Retrieved on Nov. 16, 2013]. Retrieved from the Internet: <URL: http://twiki.cin. ufpe. br/twiki/pub/ CinBTCResearchProject/PublicationsCinBTC/ A_Permutation_ Technique_for _Test_ Case _Prioritization_in_a_Biack-box_Environrnent.pdf>, entire document.

Boghdady et al. "A Propose;cl Test Case Generation Technique Based on Activity Diagrams." 1-20 In: International Journal of Engineering & Technology IJET-IJENS vol. 11 No. 03. Jun. 2011 (Jun. 2011). (Retrieved on Nov. 16, 2013]. Retrieved from the Internet: <URL: http://www.ijens.orgNol%2011 %201%2003/ 114703-5858%201JET-IJENS.pdf>, entire document.

* cited by examiner

SYSTEMS AND METHODS FOR STATE BASED TEST CASE GENERATION FOR SOFTWARE VALIDATION

TECHNICAL FIELD

Embodiments described herein generally relate to generating a test case for validating software and, more specifically, to using state based determinations to generate the test cases.

BACKGROUND

As background, many vehicles have integrated software to provide certain functionality. Before the vehicle is sold to a consumer, the software is validated to ensure that the software performs the functionality without an undesirable level of errors. The software validation can include testing the software with a number of test cases in a controlled environment that is intended to simulate the use of the vehicle. Current test case generation tools utilize two main classes of methods for test case generation to comply with the international standards organization (ISO) standards/recommendations.

The first class can be described as a formal method that utilizes mathematics to prove correctness of software. However this first class has many limitations due to the fact that non-linear mathematics, look-up tables, state-space explosion, computational limitations, and the like occur in complex software. Accordingly, this first class is often limited to smaller sized, less complicated software. The second class can be described as random test case generation that provides modified condition/decision coverage (MC/DC) through targeted random test cases. However, random test case generation is likely to provide an insufficient variety of test cases to achieve an acceptable MC/DC for complex or large software.

SUMMARY

Systems and methods for state based test case generation for software validation are disclosed. One embodiment of a method includes determining a first input and a first input type for a program block of vehicle software for creating a test case, determining permutations of values for the first input, based on the first input type, and running the test case with the state based input, where running the test case includes applying the permutations of values for the first input to the program block. Some embodiments include determining whether the test case meets a predetermined level of modified condition/decision coverage (MC/DC) and providing an indication of whether the test case meets the predetermined level of MC/DC.

In another embodiment, a system includes a test computing device with a memory that stores logic that, when executed by the test computing device, causes the test computing device to determine a first input and a first input type for a program block of vehicle software for creating a test case, determine a second input and a second input type for the program block, and determine permutations of values for the first input, based on the first input type. In some embodiments, the logic causes the test computing device to determine a mechanism for assigning values to the second input, run the test case with the state based input and the non-state based input, and determine whether the test case meets a predetermined level of modified condition/decision coverage (MC/DC).

In yet another embodiment, a non-transitory computer-readable medium causes a test computing device to select a program block from vehicle software of a vehicle to test, determine a first input and a first input type for the program block for creating a test case, and determine a second input and a second input type for the program block. In some embodiments, the non-transitory computer-readable medium causes the test computing device to determine permutations of values for the first input, based on the first input type, determine a mechanism for assigning values to the second input, based on the second input type, and run the test case with the state based input and the non-state based input, where running the test case includes applying the permutations of values for the first input to the program block with the values to the second input.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for generating a test case for software validation. Accordingly, these embodiments relate to computer-implemented methods for generating test cases based on model input characteristics for MC/DC. The embodiments can be utilized for validating software in order to comply with ISO standards/recommendations (e.g., ISO 26262). Generally, the inputs for the tested software can be categorized as state variables or non-state variables. State variables within the software can be described as flag or mode variables denoting the state of a system or outcome of an operation. State variables are used in software to express conditions and decisions. Conditions may be expressions such as, for example, on/off, 0/1, or the like. Decisions are generally composed of conditions that are operated upon by one or more Boolean operators such as, for example, if a & b are "ON", and then perform function.

The test cases disclosed herein may be generated such that certain conditions are true at least once during the validation process of the test case. The conditions that are met during validation may include: each decision attempts every possible outcome; each condition in a decision assumes the value of every possible outcome; each entry and exit point is invoked; and each condition in a decision is shown to independently affect the outcome of the decision.

Non-state variables include calculated values, controlled values, and sensor values. For non-state variables, embodiments disclosed herein can utilize mechanisms such as constant, random, random integer, ramp, sequence, transition, and permutation and the like to provide test case values for testing software.

In some embodiments, pseudo-state variables can be treated as a state variable. A pseudo-state variable is a non-state variable that is utilized in a decision in a manner analogous to a state-variable. For example, a function can be performed if a non-state variable is greater than a threshold value, (e.g., a non-state variable can have a range of 0-200 and a decision can be made when the non-state variable is greater than 50). A pseudo-state variable can be made from the non-state variable by assigning discrete values to behave as a state variable. As an example, in some embodiments, the variable may be set to 2 states: 50=On and 51=Off.

As a consequence, embodiments disclosed herein determine which inputs may be identified as state based inputs and non-state based inputs. The state based inputs may be tested for every permutation of input value possible for that state based input. Additionally, the non-state based inputs may be tested using a random number, a series of numbers, and/or other values. Based on these input determinations and input value selections, vehicle software may be tested with full MC/DC with greater efficiency.

Figure 1:
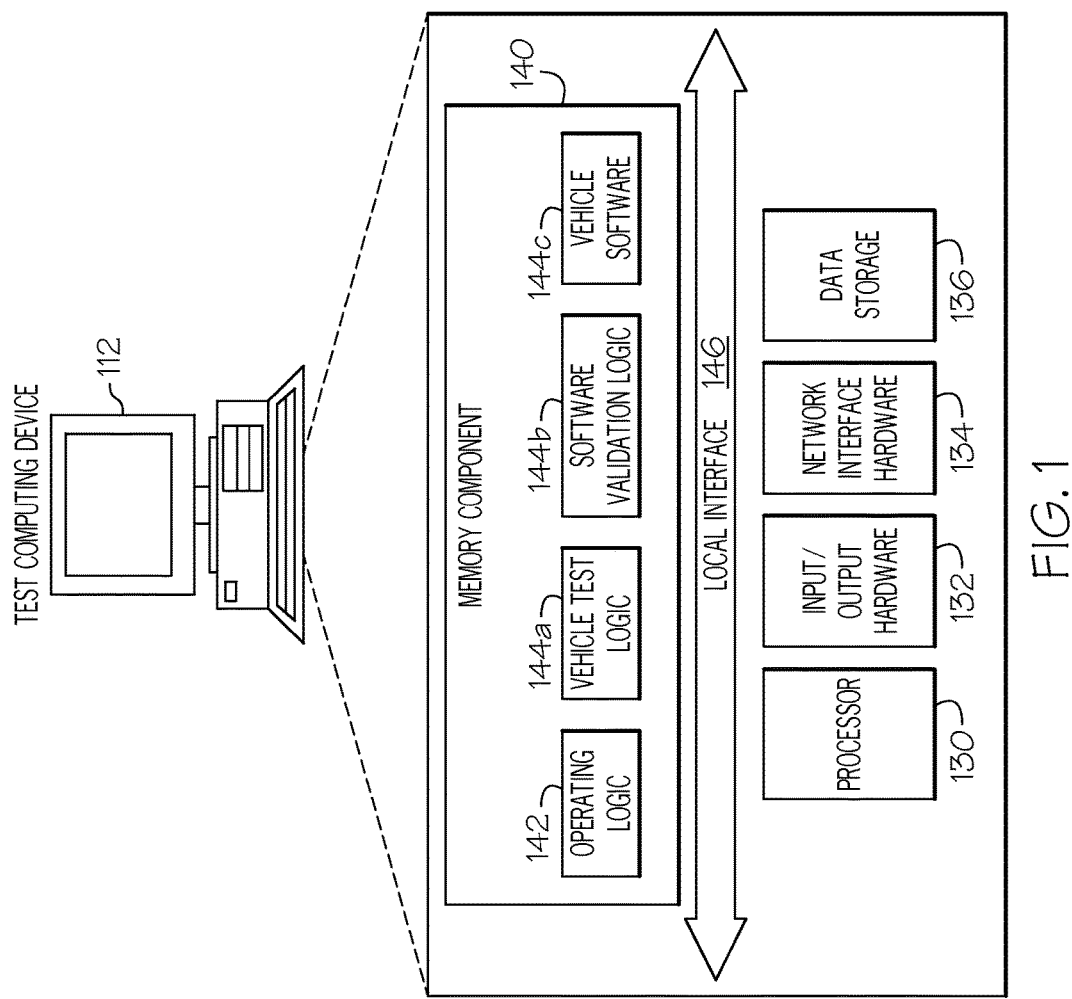
FIG. 1 schematically depicts a test computing device, as may be utilized for testing software in a vehicle, according to embodiments disclosed herein.

Referring now to the drawings, FIG. 1 schematically depicts a test computing device 112, as may be utilized for testing vehicle software 144c, according to embodiments disclosed herein. In the illustrated embodiment, the test computing device 112 includes a processor 130, input/output hardware 132, network interface hardware 134, a data storage component 136, and the memory component 140. The memory component 140 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, a non-transitory computer-readable medium may reside within the test computing device 112 and/or external to the test computing device 112.

Additionally, the memory component 140 may store operating logic 142, the vehicle software test logic 144a, the test case logic 144b, and the vehicle software 144c. The vehicle software 144c may be the piece of software that is being tested. Similarly, the vehicle software test logic 144a and the test case logic 144b may each include a plurality of different pieces of logic, each of which may be embodied as a computer program, firmware, and/or hardware, as an example. A local interface 146 is also included in FIG. 1 and may be implemented as a bus or other interface to facilitate communication among the components of the test computing device 112.

The processor 130 may include any processing component operable to receive and execute instructions (such as from the data storage component 136 and/or the memory component 140). The input/output hardware 132 may include and/or be configured to interface with a monitor, positioning system, keyboard, mouse, printer, image capture device, microphone, speaker, gyroscope, compass, and/or other device for receiving, sending, and/or presenting data. The network interface hardware 134 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the test computing device 112 and other computing devices.

The operating logic 142 may include an operating system and/or other software for managing components of the test computing device 112. Similarly, as discussed above, the vehicle software test logic 144a may reside in the memory component 140 and may be configured to cause the processor 130 to implement a test of the vehicle software 144c. As discussed in more detail below, the test implemented by the vehicle software test logic 144a may be to determine that the vehicle software 144c has been programmed without errors. Additionally, the test case logic 144b may be configured to cause the processor 130 to generate a test case for testing the vehicle software 144c. Other functionality is also included and described in more detail, below.

It should be understood that the components illustrated in FIG. 1 are merely exemplary and are not intended to limit the scope of this disclosure. While the components in FIG. 1 are illustrated as residing within the test computing device 112, this is merely an example. In some embodiments, one or more of the components may reside external to the test computing device 112. It should also be understood that, while the test computing device 112 in FIG. 1 is illustrated as a single device, this is also merely an example. In some embodiments, the vehicle software test logic 144a and the test case logic 144b may reside on different devices.

Additionally, while the test computing device 112 is illustrated with the vehicle software test logic 144a and the test case logic 144b as separate logical components, this is also an example. In some embodiments, a single piece of logic may cause the test computing device 112 to perform the described functionality.

Figure 2A:
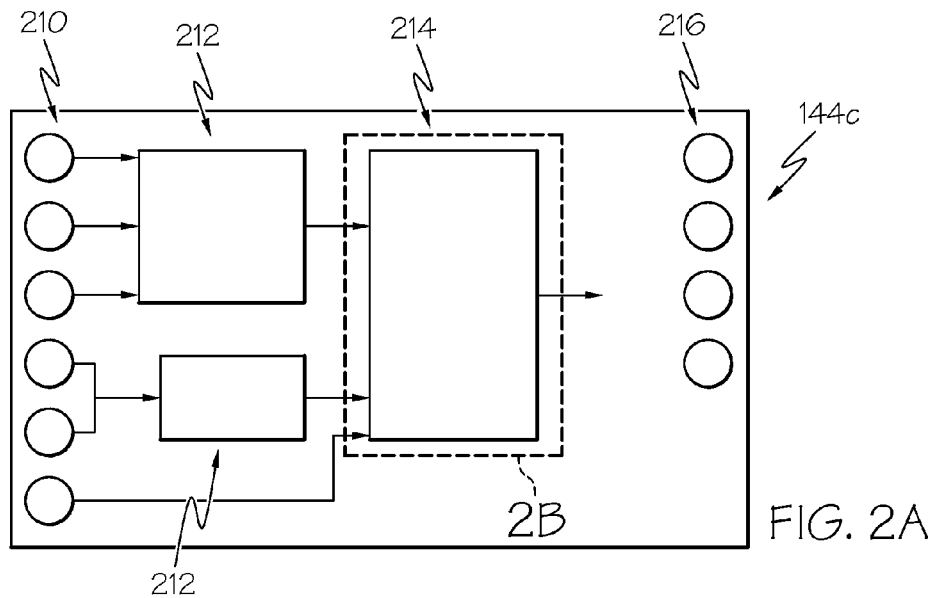
FIGS. 2A-2C schematically depict a control specification structure, illustrating a plurality of logic layers, according to embodiments disclosed herein.
Figure 2B:
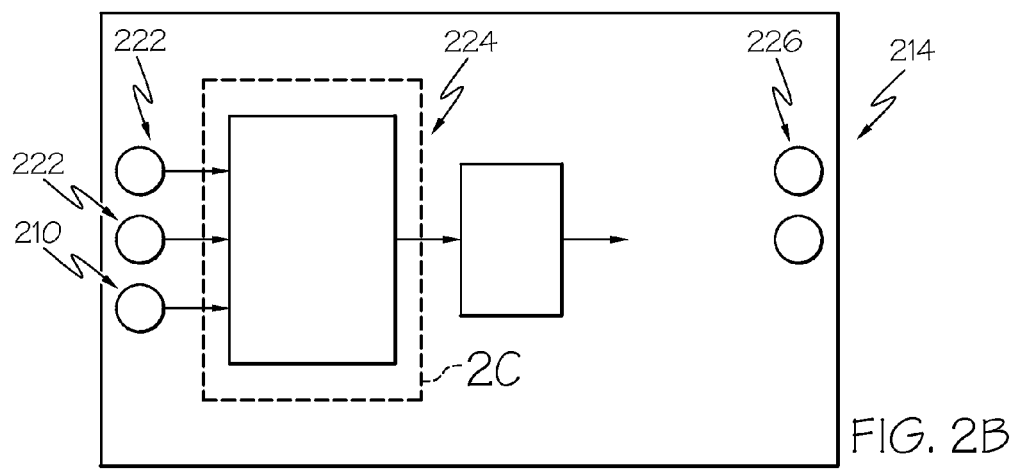
Figure 2C:
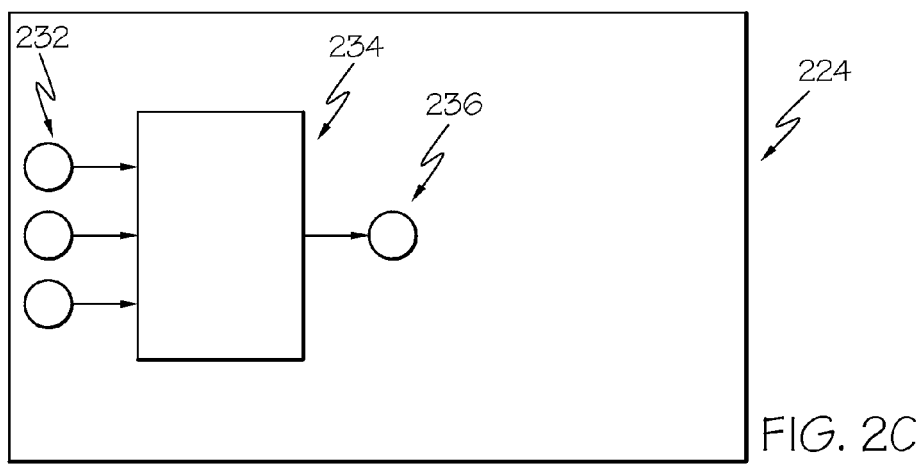

FIGS. 2A-2C schematically depict a control specification structure, illustrating a plurality of logic layers in the vehicle software 144c, according to embodiments disclosed herein. Specifically, FIG. 2A depicts an application level of the vehicle software 144c. The vehicle software 144c may include a plurality of initial inputs 210 that are sent to a status block 212. The status blocks 212 may process the inputs and send data to a functional block 214. The functional block 214 may further process the data. This may continue until the desired result is obtained and sent to one or more of the outputs 216. Accordingly, while only two levels of processing (blocks 212 and 214) are depicted in FIG. 2A, it should be understood that more or fewer levels may be utilized to implement the desired function in the vehicle 102 and/or vehicle computing device 104.

FIG. 2B depicts the functional block 214 from FIG. 2A (e.g., the functional layer). Specifically, the functional block 214 is shown with one of the initial inputs 210 from FIG. 2A, as well as the two outputs from the status blocks 212. The functional block 214 includes a plurality of module blocks for further processing data according to the vehicle software 144c. The function block outputs 226 are also depicted and may be sent to the next block in FIG. 2A.

FIG. 2C depicts the module block 224 from FIG. 2B. Specifically, inputs 232 may be provided to a block 234, which may further process the data. This data may then be again processed by other blocks and sent to an output 236.

This output 236 may then be further sent to other application layer blocks, functional layer blocks, and/or sent to output.

FIG. 2A illustrates a plurality of blocks on the application layer, each of which may include processing components within those blocks. The processing components in the application layer are depicted in detail in the functional layer in FIG. 2B. Similarly, each of the functional blocks in FIG. 2B may include additional processing components, which are represented in the module layer of FIG. 2C. Thus, to implement the vehicle software 144c (FIG. 1), the vehicle computing device 104 (also FIG. 1) will execute the logic in each of these layers. Thus, when testing the vehicle software 144c, the test computing device 112 tests each of the blocks on each of the layers to ensure that the vehicle software 144c is programmed without errors.

It should be understood that the terms input, first input, second input, etc. may be used herein to refer to inputs to the vehicle software 144c or to other values that may be sent to a logical block of the vehicle software 144c. Thus, the term input may be used to identify any value that is transmitted to a logic component.

Figure 3A:
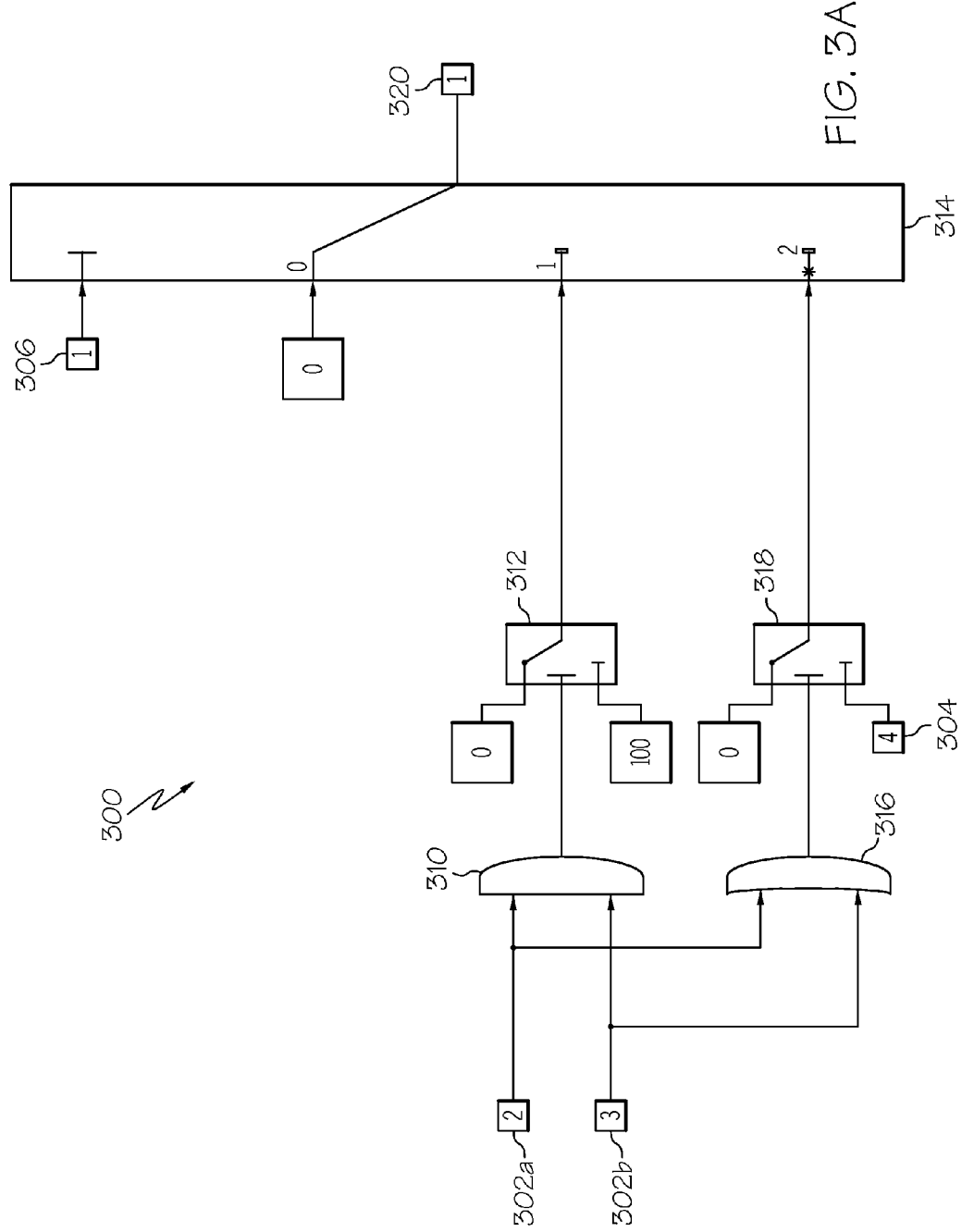
FIG. 3A depicts a logic circuit for implementing a function in a vehicle, according to embodiments disclosed herein.

FIG. 3A depicts a logic circuit 300 for implementing a function in a vehicle, according to embodiments disclosed herein. Specifically, the logic circuit 300 may represent logic within one of the blocks on the application layer, the functional layer, and/or the module layer, depicted in FIGS. 3A, 3B, and 3C, respectively. As illustrated, the logic circuit 300 includes inputs 302a, 302b (collectively referred to as "inputs 302"). The inputs 302 may take the form of binary inputs (identified as "flags"), where the input value is one of two possibilities (such as 0/1, on/off, etc.), mode inputs, where the input is one of a finite number of possibilities, and/or a variable input, where the input is one of an infinite number of possibilities (or very large number of possibilities). Accordingly, the flags and the mode inputs may be determined to be state based inputs and thus may be tested accordingly. In the current example, the inputs 302a have been determined to both be flags (binary inputs), while the input 304 has been determined to be a variable input. The input 306 has been determined to be a mode input.

Figure 3B:
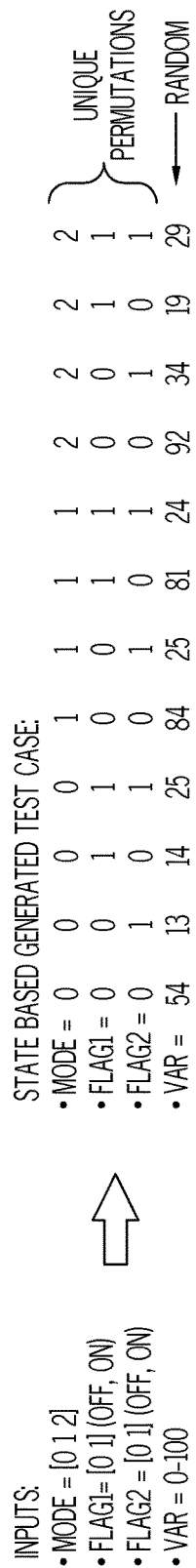
FIG. 3B depicts inputs that may be determined from the logic circuit from FIG. 3A, which may be utilized to create a test case, according to embodiments disclosed herein.

It should be understood that the determination of an input type, such as a first input type, a second input type, etc. may be made for each of the blocks on each of the application layer, the functional layer, and the module layer depicted in FIGS. 3A-3C. In addition to determining the input type, the possible input values may also be determined for each of the inputs.

Once the input types and input values are determined, the test computing device 112 may create a test case for each of the blocks in FIGS. 3A-3C. Specifically, the test cases may be created as a piece of logic that implements permutations of values (such as every permutation of state based inputs in the vehicle software 144c). Depending on the particular embodiment, testing of the variable inputs may include implementing a mechanism for testing a subset of possible values. As an example, a random value may be utilized for each permutation of the state based input values. Other mechanisms may be used, as described above.

In the present example, the logic circuit 300 includes a logical "and" operator 310 that receives the inputs 302. The output of the logical "and" operator 310 is sent to a first switch 312, along with the values 0 and 100. The first switch 312 outputs to a multiport switch 314. Similarly, the inputs 302 are also sent to a logical "or" operator 316. The output to the logical "or" operator 316 is sent to a second switch 318, which receives the input 304, as well as "0." The second switch 318 outputs to the multiport switch 314. The multiport switch 314 receives the outputs from the first switch 312 and the second switch 318, as well as the value "0" and the input 306. The multiport switch 314 selects a desired output 320.

FIG. 3B depicts inputs that may be determined from the logic circuit 300 from FIG. 3A, which may be utilized to create a test case, according to embodiments disclosed herein. As illustrated for the logic circuit 300 from FIG. 3A, the chart 340 may be provided to show each of the inputs will be implemented in the test case when testing the vehicle software 144c. As illustrated, the inputs of this example include a mode input, two flag inputs, and a variable input. Accordingly, the three state based inputs are implemented in all permutation of input values. Additionally, the variable input is implemented as a random value for each of the state permutations of the state based inputs.

Once the test case is developed, the test computing device 112 may determine whether the test case meets a MC/DC beyond a predetermined threshold (e.g., 95%, 100%, etc.). If the test case meets a predetermined MC/DC, the test case may be implemented in the vehicle software 144c to determine whether the vehicle software 144c is properly programmed.

Figure 4:
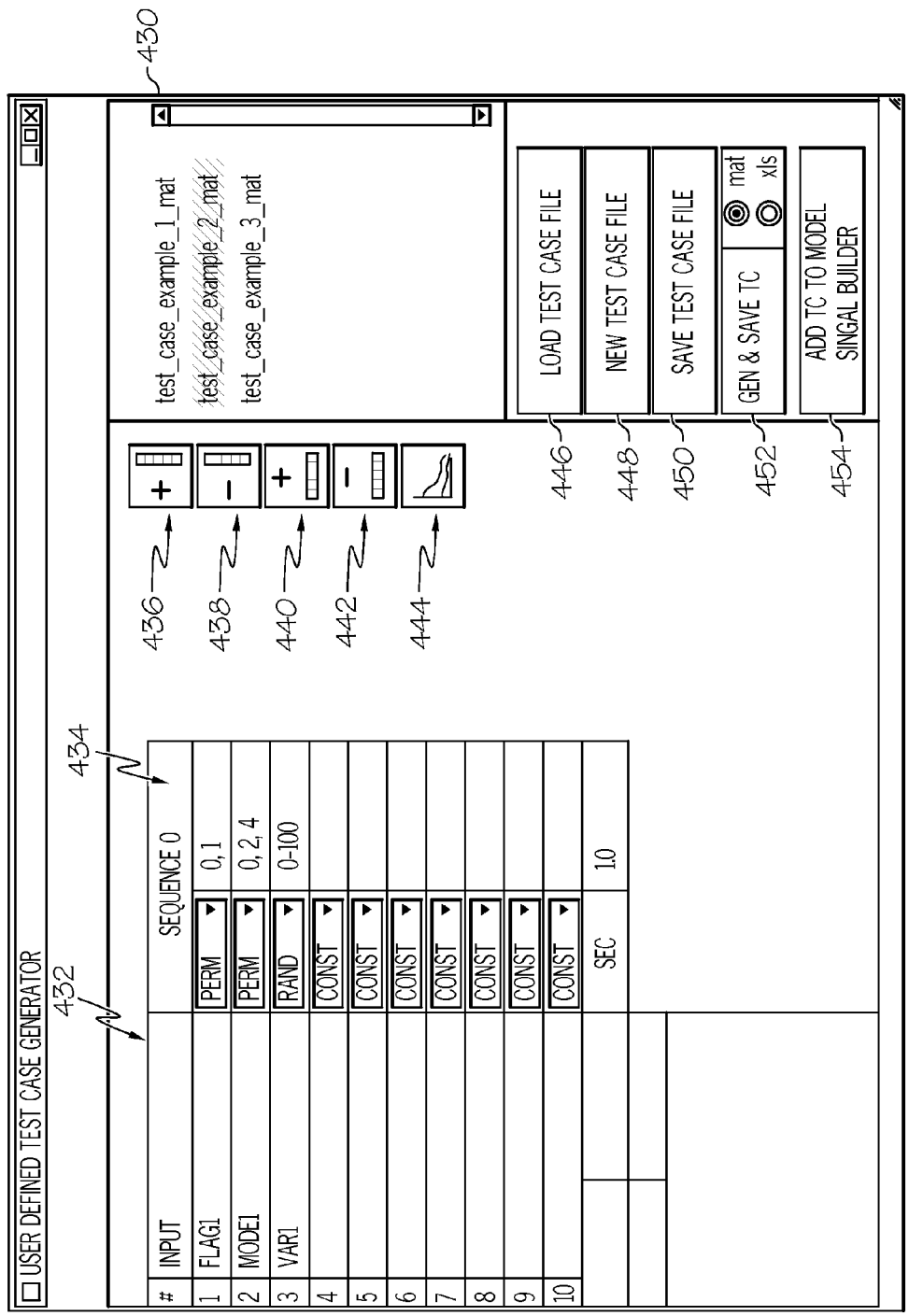
FIG. 4 depicts a user interface that may be utilized for creating the state based test case, according to embodiments disclosed herein.

FIG. 4 depicts a user interface 430 that may be utilized for creating the state based test case, according to embodiments disclosed herein. As illustrated, the test computing device 112 may provide the user interface 430 for creation of a new test case. The user may determine the inputs for each of the blocks in FIGS. 2A-2C and identify an input name in the input column 432. In the sequence column 434, the user may identify the input type that is being used, as well as the possible values for that input type.

As an example, in the first row, the user has entered an input by the name of "flag1" that will be used as a state based input, with the possible values of 0 and 1. In the second row, an input named "model" will be used as a state based input, with values of 0, 2, and 4 being possible. In the third row, an input named "var1" will be used as a random input, with values of 0-100 being possible. Other inputs may be implemented and designated, depending on the particular vehicle software 144c being tested.

It should be understood that the sequence designations depicted in FIG. 4 are merely exemplary. Specifically, designations such as constant, random, random integer, ramp (e.g., escalating values), sequence (e.g., a pattern), transition (e.g., transition data sequence over a predetermined time), permutation (e.g., generate unique permutations for multiple inputs), and/or others may be utilized. It should also be understood that while only a single sequence is depicted in FIG. 4, some embodiments may use a plurality of sequences to account for differing values of the inputs.

Also included in FIG. 4 is an add sequence option 436, a delete sequence option 438, an add input option 440, a delete input option 442, and a plot test case option 444. The add sequence option 436 may be utilized to add a sequence to the current test case. Similarly, the delete sequence option 438 may be utilized to delete a current sequence. The add input option 440 may be utilized for adding additional inputs to the test case, while the delete input option 442 may be utilized to delete an already existing input in the test case. The plot test case option 444 may be utilized to provide a graphical representation of the test case to determine whether the test case has adequate MC/DC.

Additionally included in FIG. 4 is a load test case file option 446, a new test case file option 448, a save test case file option 450, a generate and save test case option 452, and an add test case to model signal builder option 454. Specifically, the load test case file option 446 may be selected for utilizing an existing test case for the current test. The new test case file option 448 may be selected to begin a new test case. The save test case file option 450 may be selected to save the current test case. The generate and save test case option 452 may be selected to generate the completed test case for implementation, as well as save the test case. The add test case to model signal builder option 454 may be selected to add the test case to the model signal builder.

Figure 5:
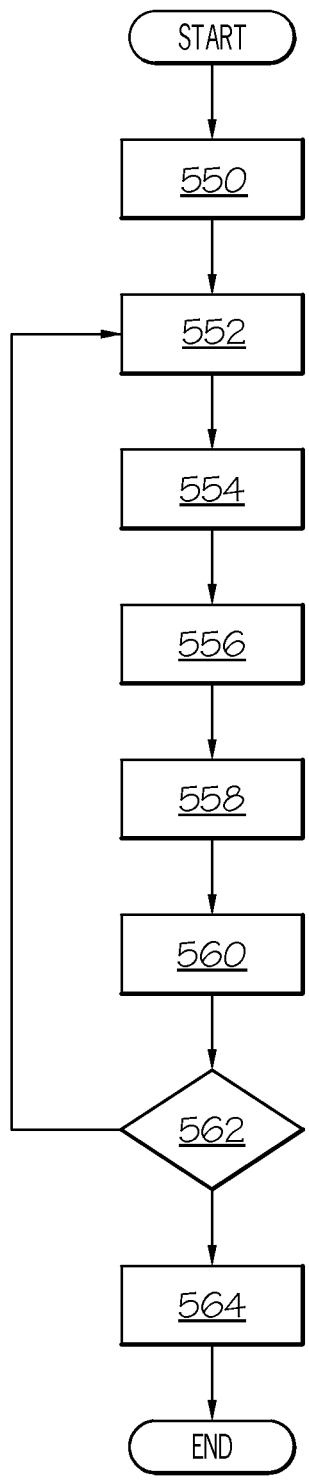
FIG. 5 depicts a flowchart for generating a state based test case, according to embodiments disclosed herein.

FIG. 5 depicts a flowchart for generating a state based test case, according to embodiments disclosed herein. As illustrated in block 550, a program block, such as an application layer block, a functional layer block, and/or a module layer block in the vehicle software 144c may be selected to test. As discussed above, the user may interact with the user interface 430 to identify the program block. In block 552, inputs and an input type may be determined for the module. As an example, this determination may be made by the test computing device 112 identifying possible input values for the input and then determining the input type. Similarly, the determination may be made by the test computing device 112 receiving the input type from a user. Regardless, the inputs may include a state based input and a non-state based input. In block 554, unique permutations of input values for the state based inputs may be determined. In block 556, a mechanism for assigning non-state based input values for the non-state based inputs may be determined. As an example, the user may identify in the user interface 430 whether the non-state based inputs will be random values, series, and/or other mechanism. In block 558, the test case may be created and run with each of the state based input values and the non-state based input values. In block 560, the results from the test case may be analyzed. In block 562, a determination may be made regarding whether the target MC/DC has been achieved. If not, the flowchart may return to block 552. If MC/DC is obtained, in block 564, the test case may be validated and utilized to test the vehicle software 144c.

It should be understood that while vehicle software 144c is discussed herein, the scope of the present disclosure is not limited only to vehicle software. Specifically, embodiments disclosed herein may be utilized for testing any type of software where at least a portion of the inputs to program blocks may be identified as state based inputs.

As illustrated above, various embodiments for state based test case generation for software validation are disclosed. Specifically, the embodiments disclosed herein may provide users with the ability to achieve a predetermined level MC/DC for a test case without the risk of using high order mathematics. Accordingly, the predetermined level of MC/DC may be obtained more easily and efficiently than in current systems.

While particular embodiments and aspects of the present disclosure have been illustrated and described herein, various other changes and modifications can be made without departing from the spirit and scope of the disclosure. Moreover, although various aspects have been described herein, such aspects need not be utilized in permutation. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for estimating a temperature calibration. As discussed above, such embodiments are configured to determine a dynamic smoothing value, which may be based on vehicle speed, coolant temperature, and/or other criteria. It should also be understood that these embodiments are merely exemplary and are not intended to limit the scope of this disclosure.

What is claimed is:

1. A method for state based test case generation for software validation comprising:
   determining, by a test computing device, a first input and a first input type for a program block of software for creating a test case, wherein the first input type includes a state based input;
   determining, by the test computing device, every permutation of values for the first input, based on the first input type;
   implementing, by the test computing device, the test case with the state based input, wherein implementing the test case comprises applying the permutations of values for the first input to the program block;
   determining, by the test computing device, a desired percentage of MC/DC;
   determining, by the test computing device, whether the test case meets the desired percentage of modified condition/decision coverage (MC/DC); and
   providing, by the test computing device, an indication of whether the test case meets the predetermined level of MC/DC.

2. The method of claim 1, further comprising:
   determining, by the test computing device, a second input and a second input type for the program block,
   wherein the second input type includes a non-state based input, and
   wherein implementing the test case further comprises selecting a value for the non-state based input for each permutation of the first input according to at least one of the following: constant, random, random integer, ramp, sequence, transition, and permutation.

3. The method of claim 1, further comprising determining, by the test computing device, the program block of the software for creating the test case.

4. The method of claim 1, further comprising determining, by the test computing device, the test case for all program blocks of the software.

5. The method of claim 1, further comprising using, by the test computing device, the test case to determine whether the software is properly programmed.

6. The method of claim 1, further comprising providing, by the test computing device, a user interface for a user to input the first input and the first input type.

7. The method of claim 1, further comprising:
   determining, by the test computing device, a second input and a second input type for the program block, wherein the second input type includes a non-state based input; and
   creating a pseudo-state input from the second input by assigning a discrete value to the second input to behave like the state-based input.

8. A system for state based test case generation for software validation comprising:
   a test computing device comprising a memory that stores logic that, when executed by the test computing device, causes the test computing device to perform at least the following:
      determine a first input and a first input type for a program block of vehicle software for creating a test case, wherein the first input type includes a state based input;

determine a second input and a second input type for the program block, wherein the second input type includes a non-state based input;

determine permutations of values for the first input, based on the first input type;

determine a mechanism for assigning values to the second input, based on the second input type;

implement the test case with the state based input and the non-state based input, wherein implementing the test case comprises applying the permutations of values for the first input to the program block with the values to the second input;

determine whether the test case meets a predetermined level of modified condition/decision coverage (MC/DC); and provide an indication of whether the test case meets the predetermined level of MC/DC.

9. The system of claim 8, wherein the mechanism for assigning values to the second input comprises at least one of the following input types: constant, random, random integer, ramp, sequence, transition, and permutation.

10. The system of claim 8, wherein the user interface is further configured for receiving the first input, the first input type, the second input, and the second input type.

11. The system of claim 10, wherein the user interface further comprises a plot test case option for providing a graphical representation of the test case.

12. The system of claim 10, wherein the user interface further comprises an add sequence option to create a plurality of sequences for testing the first input.

13. The system of claim 8, wherein the logic further causes the test computing device to determine the predetermined level of MC/DC.

14. The system of claim 8, further comprising a vehicle computing device that stores the vehicle software, wherein the vehicle computing device is configured for communicating at least one of the following with the test computing device: the vehicle software and the test case.

15. The system of claim 8, further comprising creating a pseudo-state input from the second input by assigning a discrete value to the second input to behave like the state-based input.

16. A non-transitory computer-readable medium that stores logic that, when executed by a test computing device, causes the test computing device to perform at least the following:

select a program block from vehicle software of a vehicle to test;

determine a first input and a first input type for the program block for creating a test case, wherein the first input type includes a state based input;

determine a second input and a second input type for the program block, wherein the second input type includes a non-state based input;

determine permutations of values for the first input, based on the first input type;

provide a user interface for a user to assign a mechanism for assigning values to the second input;

determine, based on received user input at the user interface, a mechanism for assigning values to the second input;

implement the test case with the state based input and the non-state based input, wherein implementing the test case comprises applying the permutations of values for the first input to the program block with the values to the second input;

determine whether the test case meets a predetermined level of modified condition/decision coverage (MC/DC); and provide an indication of whether the test case meets the predetermined level of MC/DC.

17. The non-transitory computer-readable medium of claim 16, wherein the logic further causes the test computing device to determine the predetermined level of MC/DC.

18. The non-transitory computer-readable medium of claim 16, wherein the non-state based input comprises at least one of the following input types: constant, random, random integer, ramp, sequence, transition, and permutation.

19. The non-transitory computer-readable medium of claim 16, wherein the logic further causes the test computing device to provide a user interface for receiving the first input, the first input type, the second input, and the second input type.

20. The non-transitory computer-readable medium of claim 16, wherein the user interface further comprises an option to create a plurality of sequences for testing the first input.

* * * * *